US00RE42362E

(19) United States
(12) Reissued Patent
Schuler

(10) Patent Number: US RE42,362 E
(45) Date of Reissued Patent: May 17, 2011

(54) INDUCTION HEATING SYSTEM AND METHOD

(75) Inventor: Ansgar Schuler, Stegen (DE)

(73) Assignee: Huettinger Elektronik GmbH + Co. KG, Freiburg (DE)

(21) Appl. No.: 12/277,998

(22) Filed: Nov. 25, 2008

Related U.S. Patent Documents

Reissue of:

(64) Patent No.: 7,151,242
Issued: Dec. 19, 2006
Appl. No.: 11/227,442
Filed: Sep. 16, 2005

(30) Foreign Application Priority Data

Sep. 16, 2004 (DE) ..... 10 2004 044 797

(51) Int. Cl.
*H05B 6/12* (2006.01)
*H05B 6/06* (2006.01)

(52) U.S. Cl. ..... 219/620; 219/625; 219/661; 219/665; 99/451

(58) Field of Classification Search ..... 219/620–627, 219/660–668

See application file for complete search history.

(56) References Cited

U.S. PATENT DOCUMENTS

| | | | |
|---|---|---|---|
| 4,112,287 | A | 9/1978 | Oates et al. |
| 5,376,775 | A | 12/1994 | Lee |
| 6,359,268 | B1 | 3/2002 | Walter |

FOREIGN PATENT DOCUMENTS

| | | | |
|---|---|---|---|
| DE | 3445538 | | 6/1985 |
| DE | 198 18 831 | A1 | 10/1999 |
| DE | 19818831 | | 10/1999 |
| DE | 10106245 | | 7/2002 |
| DE | 10253198 | | 6/2004 |
| DE | 10 2004 005 601 | A1 | 9/2004 |
| DE | 102004005601 | | 9/2004 |
| DE | 102004044797 | | 4/2006 |

OTHER PUBLICATIONS

Office Action from European Patent Application No. 10 2005 044 466.0-34, mailed Oct. 2, 2006, 4 pages.
English Translation of Office Action from German Patent Application No. 10 2005 044 466.0-34, mailed Oct. 2, 2006, 4 pages.

*Primary Examiner* — Thor S Campbell
(74) *Attorney, Agent, or Firm* — Fish & Richardson P.C.

(57) ABSTRACT

An excitation system for heating food, water, or both in airplanes uses induction heating. The system includes at least one load circuit including an inductor that is excited with a load circuit AC voltage, a load circuit alternating current, or both the load circuit AC voltage and the load circuit alternating current. The load circuit AC voltage, the load circuit alternating current, or both the load circuit AC voltage and the load circuit alternating current are generated from an AC voltage signal that is amplitude-modulated with a frequency of a mains AC voltage from a voltage supply. The frequency of the AC voltage signal can be predetermined.

41 Claims, 4 Drawing Sheets

INDUCTION HEATING SYSTEM AND METHOD

Matter enclosed in heavy brackets [ ] appears in the original patent but forms no part of this reissue specification; matter printed in italics indicates the additions made by reissue.

CROSS REFERENCE TO RELATED APPLICATIONS

This application claims priority under 35 U.S.C. §119(a) to German Patent Application No. 10 2004 044 797.7, filed Sep. 16, 2004, the entire contents of which are hereby incorporated by reference.

TECHNICAL FIELD

This application concerns a method and system for heating food, water, or both (such as in airplanes) using induction heating, in which at least one load circuit including an inductor is excited by a load circuit AC voltage and/or a load circuit alternating current.

BACKGROUND

In induction heating, an inductor is excited to oscillate in the medium frequency range. This inductor is conventionally integrated by means of an additional capacitance in a so-called oscillating load circuit that is excited by an inverter, for example, by adding voltage pulses close to the resonance frequency of the oscillating circuit using a bridge circuit, semi-bridge circuit, or using one single switch.

To this end, a mains voltage, for example, a single phase or multi-phase AC voltage from a voltage supply, is usually rectified and smoothed, and the DC voltage is supplied to an inverter that excites the oscillating load circuit. This configuration generates a large portion of harmonics in the current at the mains voltage supply connection. The harmonics are generated substantially through rectification and smoothing of the rectified voltage rather than by the inverter. Or, alternatively, the portions generated by the inverter can be easily filtered, since the inverter usually operates at considerably higher frequencies than the mains voltage, that is, in a range from a few kHz to some MHz.

To avoid this disadvantage, either passive filter circuits or active power factor correction (PFC) members are conventionally interconnected. Both circuits are expensive and also very heavy since they require large inductances. Moreover, these circuits require a large amount of space.

Induction ovens for airplanes are disclosed, for example, in DE 198 18 831 A1. The excitation configurations for such ovens must be light and have very narrow restrictions concerning harmonics.

The mains voltage in airplanes is 200 volts measured from phase to phase in a three-phase system that is operated at a frequency of, for example, 400 Hz. The PFC members can be operated in this region only with inductances that must be specially produced and are therefore relatively expensive and heavy. A passive filter element requires even more complex inductances (because of size, weight, and cost considerations).

It is possible to use voltages with unregulated frequencies (for example, in a range up to about 800 Hz) in airplanes. If implemented, such a design will render the use of PFC members even more complicated. Moreover, the weight and costs of the excitation configurations will also increase.

FIG. 5 shows a conventional excitation configuration. The voltage of each phase P1, P2, P3 is rectified relative to the neutral conductor N with a single bridge rectifier 11, 21, 31, respectively. Each of the DC voltages generated in this manner is supplied to a flyback converter 13, 23, 33, and each flyback converter is controlled by a PFC controller 12, 22, 32, respectively. Each PFC controller 12, 22, 32 ensures that a largely sinusoidal current is taken from the mains connection, thereby minimizing the harmonic wave portions that act on the mains. Each of the AC output voltages from the flyback converter 13, 23, 33 is rectified again using a rectifier 14, 24, 34, respectively, and is then supplied to a common DC-link voltage circuit U4. The DC-link voltage circuit U4 can be adjusted by driving the flyback converters 13, 23, 33, thereby controlling the power and energy supply of the oscillating load circuits. A common inverter 41 is connected to the DC-link voltage circuit U4. The conventional excitation configuration also includes one or more capacitances 43 and inductors 15, 25, 35 for induction heating of the food, both of which are integrated in the oscillating load circuits.

In some conventional excitation configurations, two inductors 15, 25 are used for direct heating of the food trays and a third inductor 35 is connected for heating water to generate water vapor. Such a configuration is described in DE 198 18 831 A1. The oscillating load circuit for generating water vapor is often not required, and if it is included, is usually not used for as long as the other load circuits. In this configuration, therefore, it should be possible to disconnect the inductor 35 from the oscillating load circuit. To this end, a relatively complex switch 42, which should be bipolarly operated, is required. However, this switch 42 is expensive and heavy, thus adding to the overall cost and weight of the unit that houses the entire configuration. For example, the unit around the three flyback converters 13, 23, 33 is very heavy since it requires coils with large ferrites, and is very complex and expensive.

SUMMARY

In one general aspect, a method and system for heating food in an induction oven using induction heating largely prevents harmonics.

In the method and system, a load circuit AC voltage and/or a load circuit alternating current are generated from an AC voltage signal having a frequency that can be predetermined, and are amplitude-modulated with a frequency of a mains AC voltage from a voltage supply.

Accordingly, the voltage supply is loaded only with current having few harmonics, thus ensuring that predetermined standards for limiting the current portions with frequencies that are larger than the frequency of the mains AC voltage are observed. The voltage supply is substantially loaded with the fundamental oscillation of the mains AC voltage at the phase where an excitation unit in which the method is implemented is connected. Thus, the current drawn from the voltage supply is sinusoidal and hardly has any harmonic wave portions.

Implementations can include one or more of the following features. For example, the frequency of the AC voltage signal can be chosen to be higher than the frequency of the mains AC voltage, thus permitting simple and inexpensive filtering of current and voltage portions with the frequency of the AC voltage signal. Moreover, cheaper elements having a lower weight may be used for filtering. In this manner, the current and voltage portions with the frequency of the AC voltage signal do not load the voltage supply, thus ensuring that the standards for limiting disturbing voltages at the mains AC voltage are observed.

The method can be realized using inexpensive standard components and with simple construction by rectifying the mains AC voltage and generating the AC voltage signal from the rectified mains voltage in an inverter.

The power supplied to the load circuit can be controlled in a particularly simple and inexpensive manner by influencing the frequency of the AC voltage signal. Additionally, generation of a DC-link voltage is not required. Previously-required heavy elements can be omitted. The power can be controlled only through frequency variation.

Alternatively, the power supplied to the load circuit can be controlled by omitting individual pulses during generation of the AC voltage signal. In general, an inverter generates one positive and one negative pulse from a DC voltage within one period for exciting the load circuit. The power can be controlled by omitting individual pulses, thereby reducing the power supplied to the load circuit and providing simple and inexpensive power control. An additional DC-link voltage circuit is not required.

In another general aspect, an excitation system of an induction heater, in particular, of an induction oven for an airplane, heats food, water, or both food and water. The excitation system includes a voltage supply connector for receiving a mains AC voltage from a voltage supply, and at least an excitation unit that is connected to the voltage supply connector. The excitation unit includes a rectifier for rectifying the mains AC voltage, and a load circuit having an inductor that is excited with a load circuit AC voltage generated in the excitation unit. The excitation unit also includes an AC voltage generator for generating an amplitude-modulated load circuit AC voltage through amplitude modulation of an AC voltage signal with the frequency of the mains AC voltage. The AC voltage signal, having a frequency that may be predetermined, is generated from a rectified voltage output from the rectifier.

Implementations can include one or more of the following features. The voltage supply may be a multi-phase supply including such that the voltage supply connector includes one conductor for each phase and a neutral conductor. The excitation unit can be connected to a phase, that is, a conductor of a phase, and a neutral connection, that is, the neutral conductor, or to two phases.

With an excitation system of this type, a substantially unsmoothed rectified voltage is present at the output of the rectifier and at the input of the AC voltage generator. The amplitude modulation ensures that the voltage supply is loaded only with a current with few harmonics.

The AC voltage generator can be designed as inverter, and the switching or striking times of the switching elements of the inverter can be adjusted by a control associated with the AC voltage generator. Because a control is provided to control the inverter, the frequency of the generated AC voltage signal can be almost arbitrarily adjusted. Moreover, the inverter can be controlled to omit individual pulses for driving the load circuit, such that a smaller power can be supplied into the load circuit. An excitation system of this type permits, in particular, control of the power using frequency variation. Power control is simplified with a minimum number of components, thus reducing the price and weight of the excitation system. Further methods for controlling the power, such as pulse-width modulation or phase shift are feasible.

The excitation system may include a filter element between the inverter and the AC voltage generator to filter current and voltage portions with the frequency of the AC voltage generator. Current portions of this frequency are not returned to the voltage supply. This ensures that standards for limiting disturbing voltages at the voltage supply can be observed. It is thus advantageous if the frequency of the AC voltage signal generated by the AC voltage generator is considerably higher than the frequency of the voltage supply. In this case, simple and small filters can be used to attenuate current and voltage portions with these frequencies.

The filter element may include a smoothing capacitor having a capacitance that is smaller than the capacitance of the load circuit. The smoothing capacitor capacitance may be smaller than the load circuit capacitance by a factor of ten, seven, or five. This smoothing capacitor filters the frequency of the AC voltage generator and ensures that the current of this frequency is drawn from the voltage supply only in negligibly small portions. Because the smoothing capacitor has a lower capacitance, the rectified mains voltage is not as greatly influenced. And because the currents for charging the smoothing capacitor are small, the harmonic wave portion of the current from the voltage supply remains below limit values predetermined by standards. The capacitance of the load circuit may be 100 nF.

The load circuit can be designed as series oscillating circuit with at least one capacitor and at least one inductor. The power in the series oscillating circuit can be controlled through frequency variation, that is, the power fed into the series oscillating circuit can be easily adjusted by varying the frequency of the AC voltage signal.

If the excitation system includes several excitation units, two excitation units can be provided for heating food and one excitation unit can be provided for heating water. In this way, integration of the excitation system into existing systems for heating food and water in airplanes is particularly facilitated. Moreover, one or more of the excitation units can be switched on and off, permitting separate control of food and water heating. Thus, expensive switches in the load circuit or between the AC voltage generator and the load circuit are not required.

The excitation system may include an excitation unit for each phase. The excitation system may include a central auxiliary voltage generating unit. The central auxiliary voltage generating unit may be connected to at least one phase of the voltage supply and includes an active PFC member. The central auxiliary voltage generating unit may be connected to each phase of the voltage supply.

The excitation system may also include a central control. The central control may include a digital programmable logic module. The central control may receive a voltage or a current measured at an intermediate circuit within the excitation system. The excitation system may also include a measuring device that measures the voltage or the current at the intermediate circuit and transmits the measured voltage or current to the central control. The excitation system may include a galvanic separation provided between the measuring device and the central control. The measuring device may include operational amplifiers having differential inputs.

The current values of the load circuit may be transmitted to the central control. The excitation system may include a measuring device that measures the voltage or the current of the load circuit and transmits the measured voltage or current to the central control. The excitation system may include a galvanic separation provided between the measuring device and the central control. The measuring device may include operational amplifiers having differential inputs.

Because a central auxiliary voltage generating unit is used for all of the phases instead of a voltage generating unit for each phase, costs are reduced and overall weight of the excitation system is reduced. Moreover, use of the central control to drive and/or control the excitation units and AC voltage generators saves costs and reduces weight of the excitation system.

In another general aspect, an induction heater is used on an airplane in an induction oven for heating food, water, or both food and water. The induction heater includes a voltage supply connector and at least one excitation unit connected to the voltage supply connector. The voltage supply connector receives a mains AC voltage from a voltage supply that has at least one phase. The at least one excitation unit includes a rectifier for rectifying the mains AC voltage, a load circuit, and an AC voltage generator. The load circuit includes an inductor that is excited by a load circuit AC voltage generated in the excitation unit. The AC voltage generator generates an amplitude-modulated load circuit AC voltage through amplitude modulation of an AC voltage signal with the frequency of the mains AC voltage. The AC voltage signal has a frequency that is predetermined and is generated from a rectified voltage output from the rectifier.

The induction heater can include several excitation systems that are connected to a multi-phase voltage supply. Some of the excitation units can include a first load circuit for heating food, while some of the excitation units can include a second load circuit for heating water. Each phase of the voltage supply can be connected to approximately the same number of first and second load circuits. In this way, the phases of the voltage supply are uniformly loaded.

In particular, heating of food generally requires more power than heating water. Moreover, the load circuits for heating food are generally operated for a longer time than the load circuits for heating water. If load circuits exclusively used for heating food were connected to one phase of the voltage supply, and load circuits exclusively used for heating water were connected to another phase of the voltage supply, the voltage supply would be loaded non-uniformly. Non-uniform loading of the voltage supply can be prevented by connecting several excitation units to the individual phases. The load on the phases of the voltage supply can therefore be balanced through averaging over several consumers.

Other features will be apparent from the description, the drawings, and the claims

DESCRIPTION OF DRAWINGS

Like reference symbols in the various drawings may indicate like elements.

DETAILED DESCRIPTION

Figure 1:
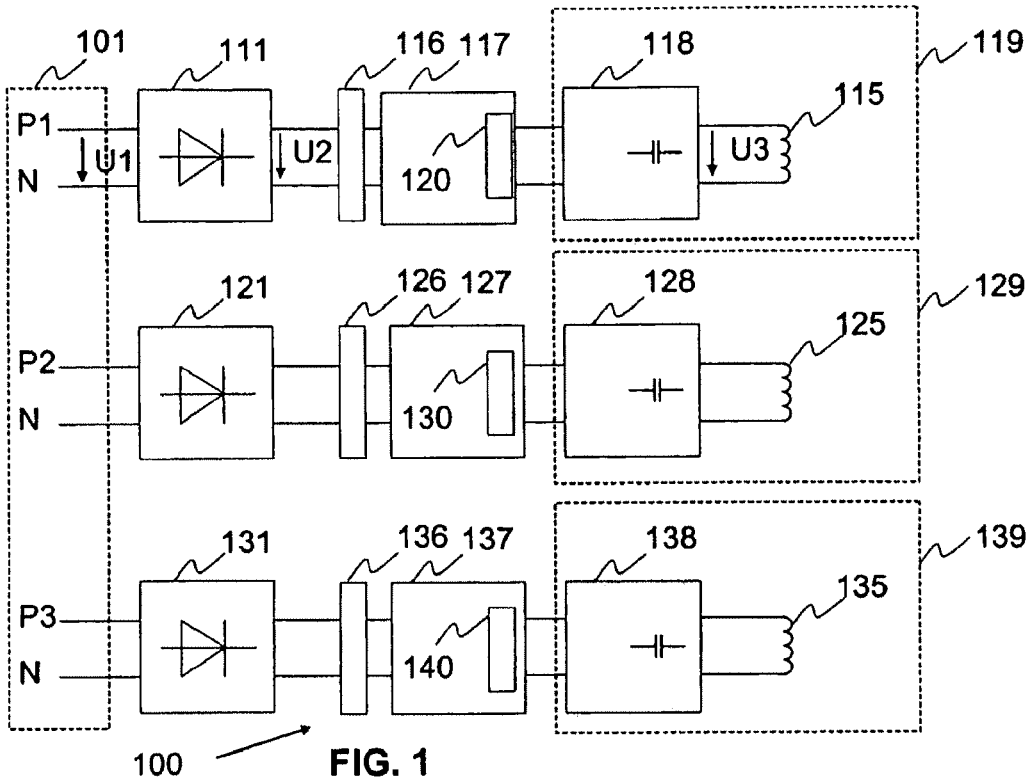
FIG. 1 shows a schematic view of an excitation system.
Figure 2A:
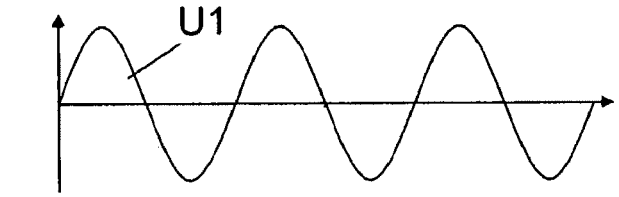
FIG. 2a shows a waveform of a mains voltage.

Referring to FIG. 1, an excitation system 100 is used for induction ovens in airplanes for heating nourishment such as food, water, or both food and water. The excitation system 100 includes a mains voltage supply connector 101 through which the system 100 is connected to a voltage supply having phases P1, P2, P3 and a neutral connection N. The mains voltage supply connector 101 can be designed as plug contact. As shown, the system 100 includes rectifiers 111, 121, 131 that are each connected to a phase P1, P2, P3, respectively, and to the neutral conductor N. The rectifiers 101, 121, 131 are therefore supplied with a mains AC voltage U1 having a mains frequency. The waveform of the AC voltage U1 is shown in FIG. 2a.

Figure 2B:
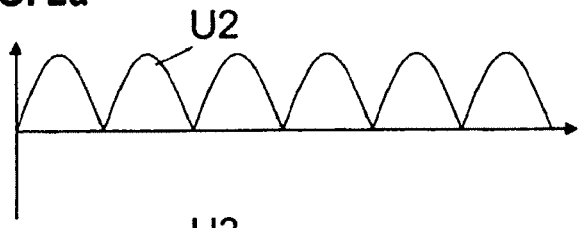
FIG. 2b shows a waveform of a rectified voltage.
Figure 2C:
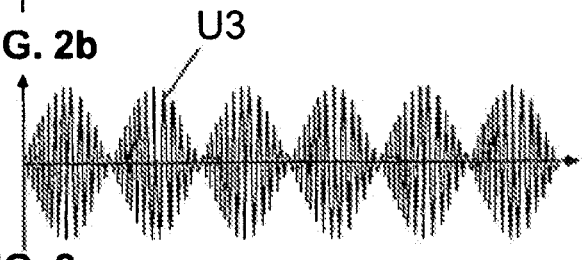
FIG. 2c shows a waveform of an amplitude-modulated load circuit AC voltage.

The rectifiers 111, 121, 131 generate a rectified voltage U2 from the mains AC voltage U1. The waveform of the rectified voltage U2 is shown in FIG. 2b. As shown, the AC voltage U1 is only minimally smoothed during rectification. The system 100 includes AC voltage generators 117, 127, 137 that are designed as inverters and are connected downstream of the rectifiers 111, 121, 131. The AC voltage generators 117, 127, 137 generate an AC voltage signal with a predetermined frequency from the rectified voltage U2, thus producing a load circuit AC voltage U3. The waveform of the load circuit AC voltage U3 is shown in FIG. 2c. The load circuit AC voltage U3 is an oscillation with the predetermined frequency that pulsates with the frequency of the unsmoothed but rectified AC voltage on the mains side. The load circuit AC voltage U3 corresponds therefore to the AC voltage signal with the predetermined frequency as carrier signal and is amplitude-modulated with the frequency of the mains AC voltage U1. The mains voltage supply is therefore substantially loaded with the fundamental oscillation of the mains which means that the current is sinusoidal and hardly has any harmonic wave portions.

The system 100 includes load circuits 119, 129, 139 that are excited with the amplitude-modulated load circuit AC voltage U3. The load circuits 119, 129, 139 are designed as series oscillating circuits and they each have a capacitor 118, 128, 138 and an inductor 115, 125, 135, respectively. The inductors 115, 125, 135 are provided for heating the food, the water, or both. The inductors 115, 125, 135 can be located remotely from the rest of the excitation system 100. The inductors 115, 125, 135 may be connected to the rest of the excitation system 100 using cables. In one implementation, the connection between the inductors 115, 125, 135 and the rest of the excitation system 100 is a plug contact to facilitate assembly and disassembly.

The system 100 also includes controls 120, 130, 140 associated with, respectively, the AC voltage generators 117, 127, 137. The controls 120, 130, 140 control the power fed into the load circuits 119, 129, 139 by adjusting the frequency of the AC voltage signal. Moreover, the system 100 may also include filter elements 116, 126, 136 between the rectifiers 111, 121, 131 and the AC voltage generators 117, 127, 137, respectively. The filter elements 116, 126, 136 attenuate harmonics in the direction of the voltage supply network.

The excitation system 100 includes three excitation units, one for each phase. The first excitation unit includes the rectifier 111, the filter 116, the AC voltage generator 117, and the load circuit 119. The second excitation unit includes the rectifier 121, the filter 126, the AC voltage generator 127, and the load circuit 129. The third excitation unit includes the rectifier 131, the filter 136, the AC voltage generator 137, and the load circuit 139.

A separate excitation unit may be provided for each phase of a multi-phase voltage supply 101. In such a design, the number of inductors 115, 125, 135 can correspond to integer multiples of the number of phases of the voltage supply 101. In induction heating systems in airplanes, such a design is feasible.

Figure 3:
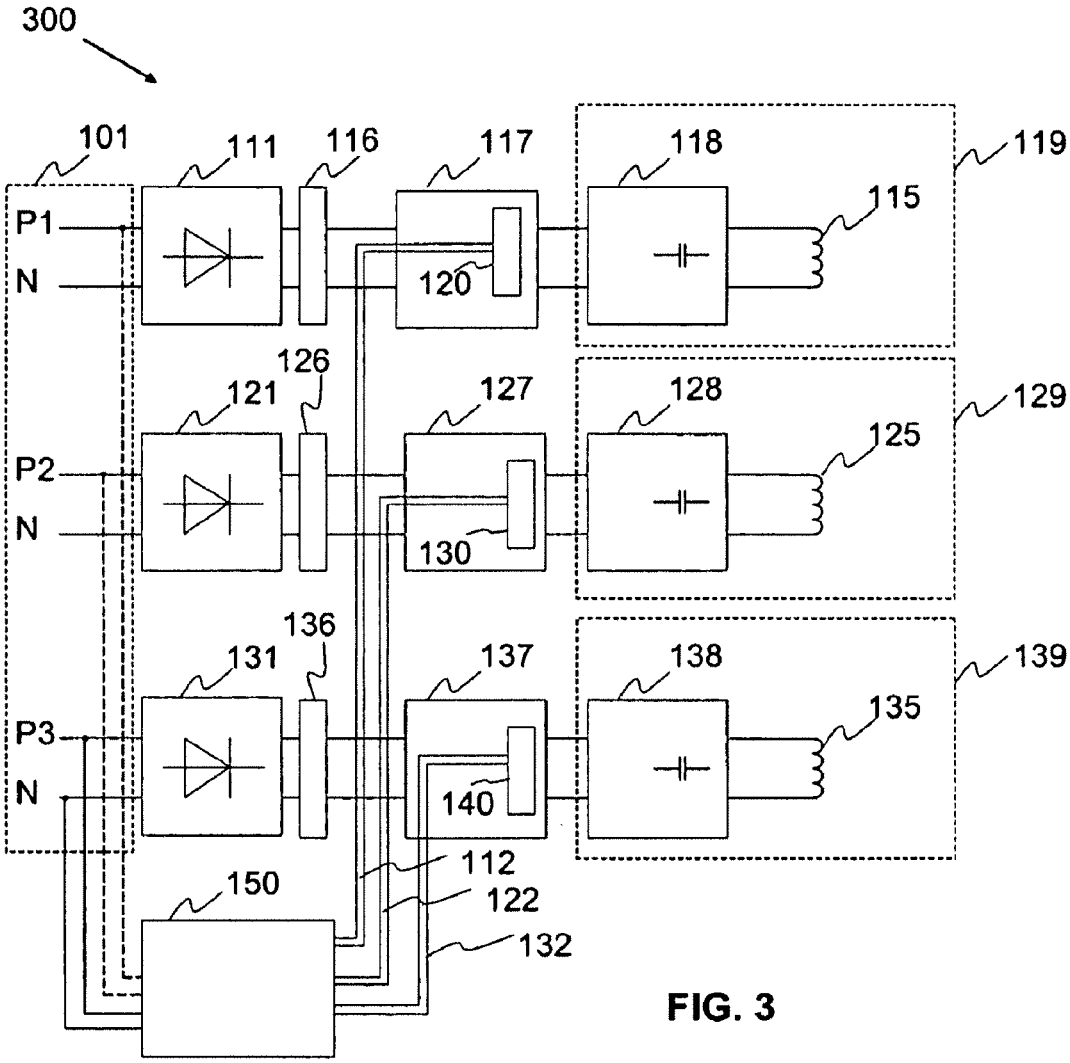
FIG. 3 shows an excitation system having an auxiliary voltage generating unit.

Referring to FIG. 3, an excitation system 300 is shown that is similar in some ways to the excitation system 100 of FIG. 1. The system 300 includes a supplemental central auxiliary voltage generating unit 150 that couples to each excitation unit. In another design, the system 300 may include a generating unit 150 for each excitation unit. In any case, the generating unit 150 generates three auxiliary voltages 112, 122, 132 that are smoothed DC voltages that feed into and supply, respectively, the controls 120, 130, 140 and the AC voltage generators 117, 127, 137. The auxiliary voltages 112, 122, 132 may be galvanically separated for example, using optocouplers with voltage-controlled oscillators (VCOs). The generating unit 150 is connected to each phase of the mains voltage supply that feeds into the connector 101, such that for a voltage supply having a single phase P3, the unit 150 connects to the single phase P3 and N, and for a voltage supply having three phases P1, P2, P3, the unit 150 connects to each phase P1, P2, P3 and N. The generating unit may include an active PFC member.

Figure 4:
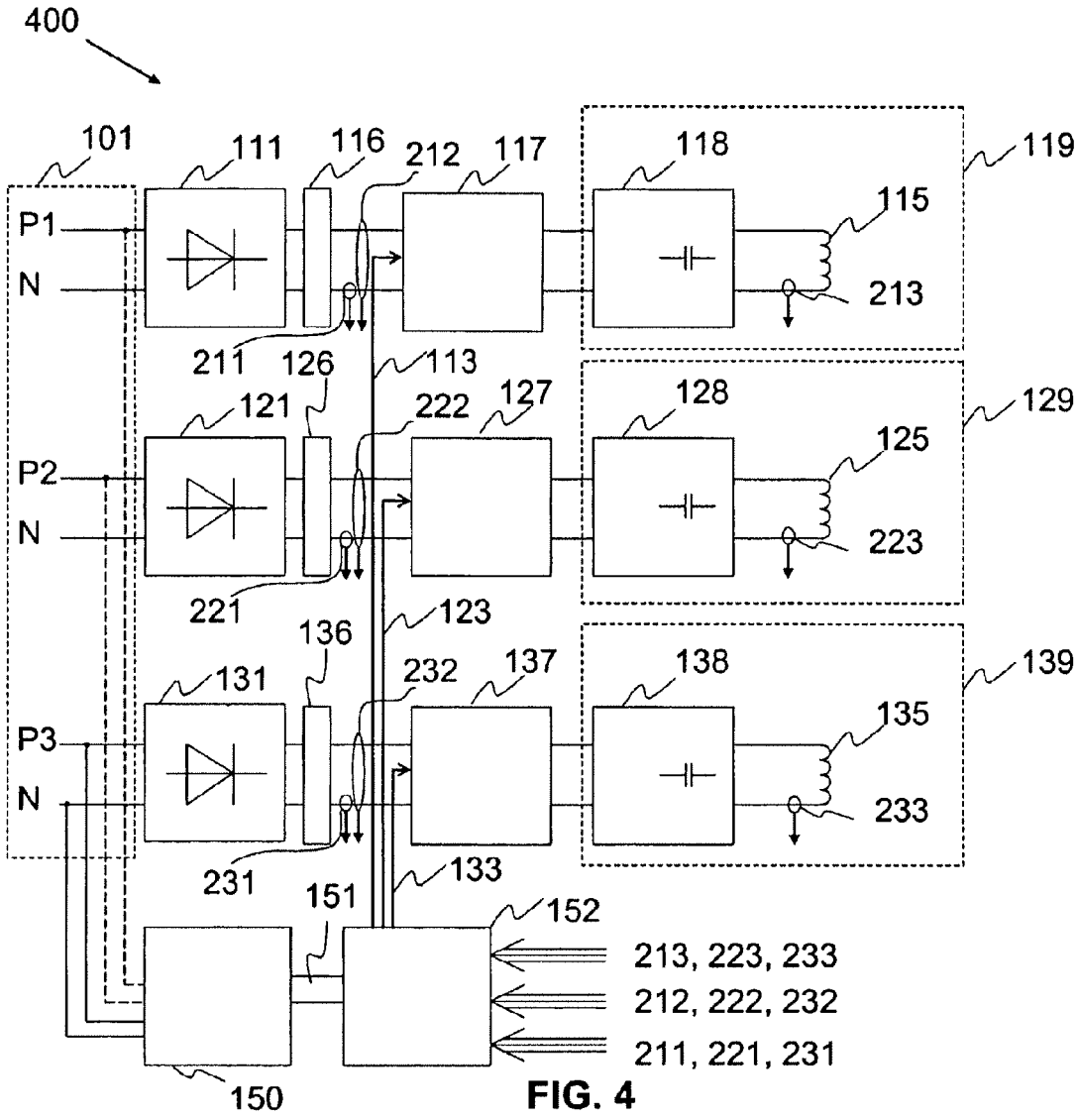
FIG. 4 shows an excitation system having a central control.
Figure 5:
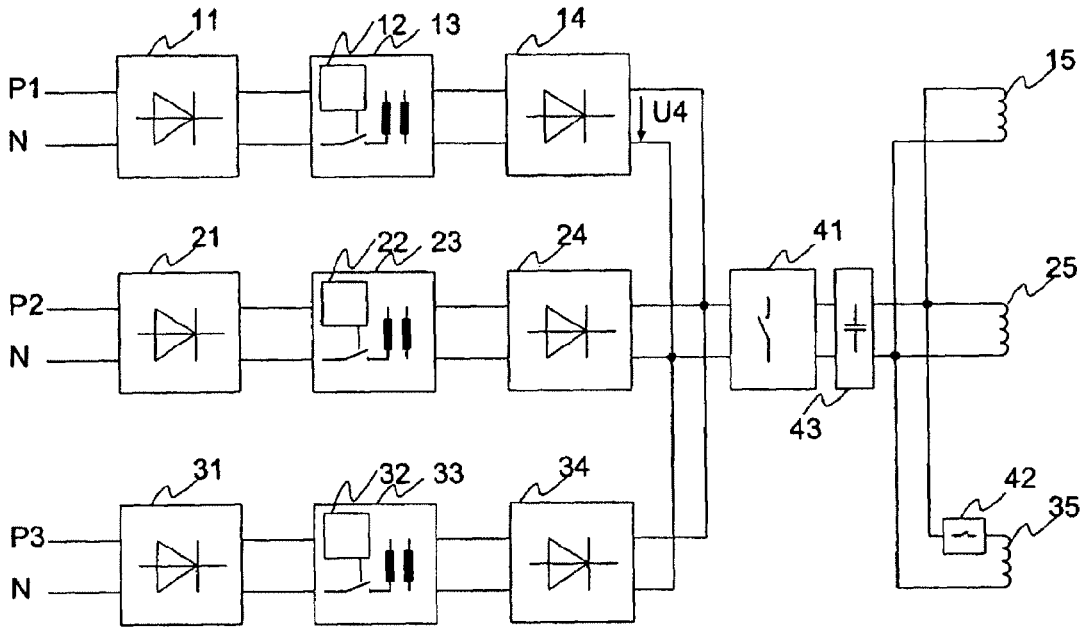
FIG. 5 shows an excitation system of a prior design.

Referring to FIG. 4, an excitation system 400 is shown that is similar in some ways to the excitation systems 100 and 300 of, respectively, FIGS. 1 and 3. The excitation system 400 also includes a central control 152 that drives and/or controls the excitation units, and in particular, the AC voltage generators 117, 127, 137. The generating unit 150 supplies the central control 152 with an auxiliary voltage 151. The central control 152 controls the AC voltage generators 117, 127, 137 through, respectively, control cables 113, 123, 133. The central control may include one or more of a microcontroller, a digital signal processor, or a digital programmable logic module.

While not shown in FIG. 4, the AC voltage generators 117, 127, 137 may also be supplied with, respectively, the auxiliary voltages 112, 122, 132, as shown in FIG. 3. Auxiliary voltages are used, for example, to supply the driver circuits in the AC voltage generators 117, 127, 137.

The central control 152 may receive intermediate circuit voltages 211, 221, 231 that are measured on each phase at the neutral line feeding, respectively, the AC voltage generators 117, 127, 137. Additionally, the central control 152 may receive intermediate circuit voltages 212, 222, 232 that are measured across each phase feeding, respectively, the AC voltage generators 117, 127, 137. Lastly, the central control 152 may receive intermediate circuit voltages 213, 223, 233 that are measured at, respectively, the inductors 115, 125, 135 of the load circuits 119, 129, 139. The intermediate circuit voltages may be measured using any suitable measuring device, and the intermediate circuit voltages can be galvanically separated from each other using, for example, operation amplifiers with differential inputs. Moreover, the measuring device and the central control can be galvanically separated using any suitable barrier. Intermediate circuit voltages can be, for example DC link voltages.

In this way, a feedback system can be formed in which power to the load circuit 119, 129 139 is determined based on the measured voltages 213, 223, 233, and this power is averaged over at least one period of the frequency of the mains AC voltage. The central control 152 compares the average power to a predetermined nominal power, and adjusts the AC voltage generators 117, 127, 137 (through, respectively, the control cables 113, 123, 133) so that a power applied to the load circuits 119, 129, 139 and measured through voltages 213, 223, 233 matches the predetermined nominal power. The power to load circuit can be averaged over several periods, for example five periods. Such a feedback system reduces harmonic waves in the excitation system. Moreover, if the feedback is made too fast in the feedback system, then the central control could respond to amplitude modulation and counteract, thus producing new harmonic wave. If this occurs, then the actual power supplied to the load circuit can be measured without averaging, thus providing control with a control response time (reset time) that is greater than one period, for example, five periods of the frequency of the mains AC voltage.

An induction oven for induction heating can include several excitation units. Moreover, the inductors 115, 125, 135 of the individual excitation units may be dimensioned differently. That is, if the inductors 115, 125 are provided for heating food and the inductor 135 is provided for heating water, an induction oven with several excitation systems 100 should have approximately the same number of inductors 115, 125 and inductors 135 connected to each of the phases P1, P2, and P3.

The frequency of the mains AC voltage U1 is in the audible range. Since this frequency also excites the inductor coil, noise may be produced in the food trays and inductors. This is, however, not as important in airplanes since the turbines and ventilation noise far exceed these noises. Moreover, the noise is generated in a closed, insulated oven. For this reason, the excitation system 100 is particularly suited for use in airplanes.

Other implementations are within the scope of the following claims.

What is claimed is:

1. A method for heating food, beverage, or both in an airplane using induction heating, the method comprising:

exciting at least one load circuit including an inductor with a load circuit AC voltage;

generating the load circuit AC voltage from an AC voltage signal having a predetermined frequency by amplitude-modulating the AC voltage signal with a frequency of a mains AC voltage from a voltage supply *having multiple phases*; and controlling the power supplied to the load circuit by influencing the frequency of the AC voltage signal.

2. The method of claim 1, wherein a frequency of the AC voltage signal is larger than the frequency of the mains AC voltage.

3. The method of claim 1, further comprising rectifying the mains AC voltage, and generating the AC voltage signal in an inverter from the rectified mains voltage.

4. The method of claim 1, further comprising controlling the power supplied to the load circuit by omitting individual pulses during generation of the AC voltage signal.

5. The method of claim 1, further comprising:

measuring an actual power supplied to the at least one load circuit;

comparing the measured power to a predetermined nominal power; and adjusting the actual power supplied to the at least one load circuit until the actual power supplied to the at least one load circuit matches the predetermined nominal power.

6. An excitation system of an induction heater for use on an airplane for heating food, beverage, or both, the system comprising:

a voltage supply connector adapted for receiving a mains AC voltage from an aircraft voltage supply having multiple phases, and multiple excitation units connected to the voltage supply connector, each of which excitation units provided for a respective phase of the multiple phases, each excitation unit comprising:

a rectifier for rectifying a respective portion of the mains AC voltage, a load circuit with an inductor that is excited by a load circuit AC voltage generated in the excitation unit, and an AC voltage generator for generating an amplitude-modulated load circuit AC voltage through amplitude modulation of an AC voltage signal with the frequency of the mains AC voltage, wherein the AC voltage signal has a frequency that is predetermined and is generated from a rectified voltage output from the rectifier.

7. The excitation system of claim 6, further comprising a control associated with the AC voltage generator, wherein the AC voltage generator is designed as inverter, and wherein the control can be used to adjust switching or striking times of a switching element of the inverter.

8. The excitation system of claim 6, further comprising a filter element between the rectifier and the AC voltage generator.

9. The excitation system of claim 8, wherein the filter element includes a smoothing capacitor with a capacitance that is smaller than the capacitance of the load circuit.

10. The excitation system of claim 9, wherein the smoothing capacitor capacitance is smaller than the load circuit capacitance by a factor of ten.

11. The excitation system of claim 9, wherein the smoothing capacitor capacitance is smaller than the load circuit capacitance by a factor of seven.

12. The excitation system of claim 9, wherein the smoothing capacitor capacitance is smaller than the load circuit capacitance by a factor of five.

13. The excitation system of claim 6, wherein the load circuit is a series oscillating circuit having at least one capacitor and at least one inductor.

14. The excitation system of claim 6, wherein the voltage supply connector comprises a connector for each of several phases of the voltage supply, and one excitation unit is connected to one phase and one neutral connection (N), or to two phases.

15. The excitation system of claim 6, wherein one or more of the excitation units can be switched on and off.

16. The excitation system of claim 6, further comprising a central auxiliary voltage generating unit.

17. The excitation system of claim 16, wherein the central auxiliary voltage generating unit is connected to at least one phase of the voltage supply and includes an active PFC member.

18. The excitation system of claim 16, wherein the central auxiliary voltage generating unit is connected to each phase of the voltage supply.

19. The excitation system of claim 6, further comprising a central control.

20. The excitation system of claim 19, wherein the central control comprises a digital programmable logic module.

21. The excitation system of claim 19, wherein the central control receives a voltage or a current measured at an intermediate circuit within the excitation system.

22. The excitation system of claim 21, further comprising a measuring device that measures the voltage or the current at the intermediate circuit and transmits the measured voltage or current to the central control.

23. The excitation system of claim 22, further comprising a galvanic separation provided between the measuring device and the central control.

24. The excitation system of claim 22, wherein the measuring device comprises operational amplifiers having differential inputs.

25. The excitation system of claim 19, wherein current values of the load circuit are transmitted to the central control.

26. The excitation system of claim 25, further comprising a measuring device that measures the voltage or the current of the load circuit and transmits the measured voltage or current to the central control.

27. The excitation system of claim 25, further comprising a galvanic separation provided between the measuring device and the central control.

28. The excitation system of claim 25, wherein the measuring device comprises operational amplifiers having differential inputs.

29. An induction heater for use on an airplane, the induction heater comprising:

a voltage supply connector adapted for receiving an aircraft voltage supply having at least two phases and supplying a mains AC voltage; and at least one excitation unit provided for each phase of the aircraft voltage supply and connected to the voltage supply connector, each excitation unit comprising:

a rectifier for rectifying a respective portion of the mains AC voltage, a load circuit with an inductor that is excited by a load circuit AC voltage generated in the excitation unit, an AC voltage generator for generating an amplitude-modulated load circuit AC voltage through amplitude modulation of an AC voltage signal with the frequency of the mains AC voltage, and a filter element for attenuating harmonics generated within the excitation unit to mitigate deleterious effects on the aircraft voltage supply, wherein the AC voltage signal has a frequency that is predetermined and is generated from a rectified voltage output from the rectifier.

30. The induction heater of claim 29, wherein one or more of the at least one excitation units comprise a first load circuit configured for heating food.

31. The induction heater of claim 30, wherein one or more of the at least one excitation units comprise a second load circuit configured for heating beverage.

32. The induction heater of claim 31, wherein the same number of first and second load circuits is connected to each phase of the voltage supply.

33. A method for heating food, beverage, or both in airplanes using induction heating, the method comprising:

exciting at least one load circuit including an inductor with a load circuit AC voltage;

generating the load circuit AC voltage from an AC voltage signal having a predetermined frequency by amplitude-modulating the AC voltage signal with a frequency of a mains AC voltage from a voltage supply *having multiple phases*; and controlling the power supplied to the load circuit by omitting individual pulses during generation of the AC voltage signal.

34. The method of claim 33, wherein a frequency of the AC voltage signal is larger than the frequency of the mains AC voltage.

35. The method of claim 33, further comprising rectifying the mains AC voltage, and generating the AC voltage signal in an inverter from the rectified mains AC voltage.

36. A method for heating food, beverage, or both in an airplane using induction heating, the method comprising:

exciting at least one load circuit including an inductor with a load circuit AC voltage;

generating the load circuit AC voltage from an AC voltage signal having a predetermined frequency higher than a frequency of an airplane mains AC voltage by amplitude-modulating the AC voltage signal with the frequency of the airplane mains AC voltage; and attenuating harmonics of the load circuit AC voltage from reaching an airplane mains AC voltage supply by filtering the harmonics with a filter element.

37. The method of claim 36 wherein the filter element further comprises a smoothing capacitor having a capacitance that is smaller than a capacitance of the at least one load circuit.

38. The method of claim 37 wherein the smoothing capacitor is at least five times smaller than the capacitance of the at least one load circuit.

39. The method of claim 36 further comprising controlling the power supplied to the load circuit by influencing the frequency of the AC voltage signal.

40. The method of claim 36, further comprising rectifying the airplane mains AC voltage, and generating the AC voltage signal in an inverter from the rectified airplane mains voltage.

41. The method of claim 36, further comprising controlling the power supplied to the load circuit by omitting individual pulses during generation of the AC voltage signal.

* * * * *